Nov. 10, 1959

W. SHOCKLEY 2,912,598

SHIFTING REGISTER

Filed March 29, 1956

INVENTOR.
*William Shockley*
BY *Flehr and Swain*
*Attorneys*

United States Patent Office 2,912,598

Patented Nov. 10, 1959

2,912,598

SHIFTING REGISTER

William Shockley, Los Altos, Calif., assignor to Shockley Transistor Corporation, Palo Alto, Calif., a corporation of California Application March 29, 1956, Serial No. 574,740

13 Claims. (Cl. 307—88.5)

This invention relates generally to a shifting register and more particularly to a shifting register including semiconductor devices.

As is well known, registers are used to perform many operations in digital computors. A register comprises a series of storage units or elements each serving to store a binary digit. A shifting register is one in which the digital information stored in each of the units may be shifted to the next adjacent storage unit in response to a suitable shifting signal. The information carried in a shifting register is available either serially or in parallel.

Prior art shifting registers employ a plurality of bi-stable circuits of the flip-flop type in each of the storage units. The bi-stable circuits are pulsed to shift the digital information. Generally a considerable number of vacuum tubes and associated circuitry is required for each storage unit. Shifting registers of the gas conduction type are also found in the prior art. These devices depend upon the transfer of gas conduction from one electrode to the next in response to D.-C. pulses which are applied to the appropriate electrodes.

It is an object of the present invention to provide a shifting register which includes semiconductor devices.

It is another object of the present invention to provide a shifting register which will operate at relatively high speeds.

It is still another object of the present invention to provide a shifting register which has a relatively long life.

It is another object of the present invention to provide a shift register having a high efficiency.

These and other objects of the invention will appear more clearly from the following description when read in conjunction with the accompanying drawings.

Referring to the drawings.

A review of the of the theory of semiconducting devices is helpful in understanding the operation of the shifting register of the invention.

Semiconductors may generally be classified as two types; one in which the majority carriers are electrons; and the other in which the majority carriers are holes. Generally the terms n-type and p-type are applied to semiconductive material. Material in which the majority carriers are negative charges, or electrons is referred to as n-type, while p-type refers to material in which the majority carriers are holes or positive charges.

Semiconductive material in its pure state has an equal number of electrons and holes. If impurities are added to the pure material, then, depending upon the type of impurities, the sample will be either n-type or p-type. Impurities which when added form n-type semiconductive material are called donors, and impurities which form p-type material, acceptors. If donors are added to p-type material or acceptors are added to n-type material they serve to compensate the material. I.e., they serve to reduce the number of majority carriers present.

A junction is formed when a piece of semiconductive material has a variable concentration of donor and acceptor centers so that the transition from p-type to n-type is continuous in a solid specimen. P-n junctions may be formed in many ways. They occur naturally in melts of relatively pure silicon because of the segregation of impurities upon solidification. They may also be produced by converting one part of a piece of n-type material to p-type material by nuclear bombardment or heating.

Figure 3:
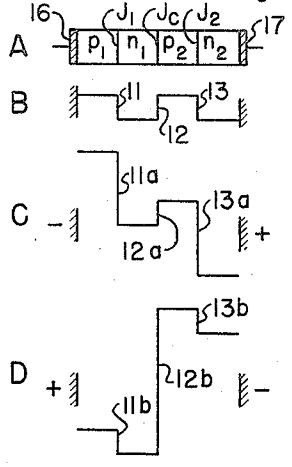
Figure 3 shows in section a switching semiconductor device and electron energy diagrams useful in explaining its operation.

Referring to Figure 3A, a semiconductive device having three junctions $J_1$, $J_c$, and $J_2$ is shown. The device comprises four regions of semiconductive material suitably formed to give the respective junctions. The regions comprise n-type regions $n_1$ and $n_2$ and p-type regions $p_1$ and $p_2$.

Assuming that no voltage is applied and that equilibrium exists, the holes which are more concentrated in the p-type regions tend to diffuse into the n-type regions. Similarly, the electrons which are more concentrated in the n-type regions tend to diffuse into the p-type regions. As a result, an electrostatic field is generated at the junctions. At equilibrium, the energy required for an electron to travel from one region to another is depicted by Figure 3B. Thus, an electron in the region $n_1$ requires the electron energy shown by the rises 11 or 12 before it can overcome the electrostatic field and travel into the adjacent p-type regions $p_1$, $p_2$. Similarly, an electron in the region $n_2$ requires the energy 13 to diffuse into the region $p_2$. A similar energy diagram may be drawn for the energy required by the holes in the p-type regions to diffuse into the n-type regions.

If ohmic contacts 16 and 17 are formed on the ends of the device and a voltage is applied between the contacts, the electron energy diagrams for the two possible polarities are depicted by Figures 3C and 3D. Assume first that the applied voltage makes the ohmic contact 16 negative with respect to the ohmic contact 17, the energy diagram of Figure 3C results if the voltages which are applied do not exceed the breakdown voltage for the junctions $J_1$ and $J_2$.

The electron energy 11*a* required by an electron in $n_1$ to diffuse into $p_1$ has been considerably increased. The electron energy 13*a* required for an electron in $n_2$ to diffuse into $p_2$ is likewise increased. If the voltage applied between the contacts 16 and 17 is less than the combined breakdown voltage of the junctions $J_1$ and $J_2$, very little current will flow since the current path includes two reversely biased junctions. Nearly all of the voltage drop will be across the junctions $J_1$ and $J_2$.

If the voltage applied between the ohmic contacts 16 and 17 is reversed in polarity, the energy diagram shown in Figure 3D results. The junctions $J_1$ and $J_2$ are forward biased, while the junction $J_c$ is reversely biased. The height of the electron energy hill 12*b*, which represents the energy required for an electron to travel from $n_2$ to $p_1$, is increased. If the voltages are below breakdown voltage for the junction $J_c$ the current flow is small. The applied voltage will appear largely across the junction $J_c$.

As the reverse bias voltage applied to a junction is increased, a breakdown voltage is reached and the junction becomes conducting in the sense that relatively large currents are produced. This voltage is often referred to as the Zener voltage because it was originally believed to be due to a process of field induced generation of hole-electron pairs at the junction. When the voltage is reduced below the breakdown value, the junction ceases to conduct in the sense that only a small current flows.

Referring to the device shown in Figure 3A, assume that a voltage having the polarity shown in Figure 3C is applied. If the voltage is increased until it is equal to the sum of the breakdown voltages of the junctions $J_1$ and $J_2$ the device will become conducting. As soon as the voltage is reduced below this value, the device will become non-conducting.

Assume now that a voltage having the polarity shown in Figure 3D is applied. The left-hand portion of the device comprising $p_1—n_1—p_2$ and the right-hand portion comprising $n_1—p_1—n_2$ may be viewed as a pair of coupled complementary transistors in which $p_1$ and $n_2$ are the emitter regions respectively and in which $J_c$ is the collector for both. A fraction $\alpha_1$ of the current flowing across $J_1$ consists of carriers emitted by $p_1$ which are transported by diffusion through $n_1$ and is collected by $J_c$. Similarly, a fraction $\alpha_2$ of the current across $J_2$ is collected by $J_c$. As the voltage is increased, the forward bias on the junctions $J_1$ and $J_2$ increases slightly, most of the voltage appearing as a voltage increase at the junction $J_c$.

When the voltage across the junction $J_c$ reaches a point where secondary generation of carriers occurs, an avalanche of carriers will be produced at the junction $J_c$. These carriers are collected and caught in the potential hook at the junctions $J_1$ and $J_2$. This increases the forward bias across the junctions $J_1$ and $J_2$ and the current density flowing through the device.

A second effect now occurs. As the current density increases $\alpha_1$ and $\alpha_2$ increase.

When $\alpha_1+\alpha_2=1$, the device will shift abruptly into a high conduction condition. The $\alpha$'s continue to increase, and the voltage required to maintain the high conduction condition is decreased.

The $\alpha$'s should be small at low current densities and should increase at higher current densities. The device is then stable at low current densities and will switch abruptly at higher densities when the voltage across the junction $J_c$ is sufficiently high to produce secondaries by the avalanche process. In general, recombination centers present in the material serve to control the recombination of injected carriers in such a manner that the $\alpha$'s are low at low current densities and increase rapidly at high current densities. Leakage across the forward biased junctions accomplishes the same result. In some instances it is desirable to place a resistance in shunt with the junction to produce the desired change in $\alpha$ with current density.

Figure 4:
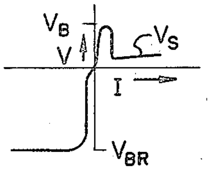
Figure 4 is a diagram of voltage and current for a device of the type shown in Figure 3.

Referring particularly to Figure 4, the diagram illustrates the operation of the device. Referring to the third quadrant, it is seen that a large negative voltage $V_{BR}$ is required to break down the device. The voltage must be sufficient to break down the series junctions $J_1$ and $J_2$. It is also seen that the large breakdown voltage must be sustained in order for the device to conduct, as described in connection with Figure 3C.

Referring now to the first quadrant, it is seen that when the voltage reaches the value $V_B$ (the breakdown voltage) the voltage required to sustain conduction suddenly drops to the value $V_s$ (the sustaining voltage). As more current is drawn from the device, the sustaining voltage is slightly increased.

It should be noted in passing that the breakdown voltage is determined by the setting in of avalanche at $J_c$. The breakdown voltage may be set to any predetermined value by controlling the concentration gradient in the junction.

Figure 1:
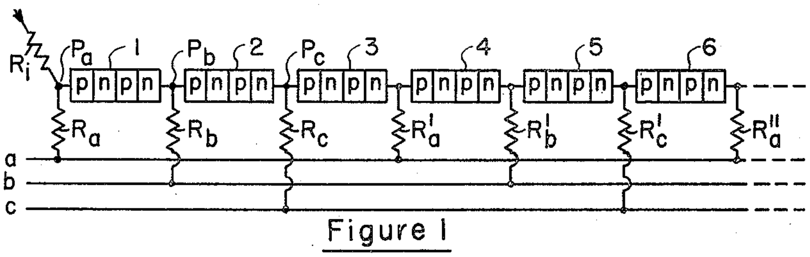
Figure 1 illustrates the shifting register of the invention.

Referring now to Figure 1 in which a shifting register is illustrated, a plurality of semiconductor switching devices of the type described are serially connected. For purposes of illustration, six such devices are shown and numbered 1–6. Three driving lines *a, b, c* are associated with the devices and serve to control the shifting of information from one storage unit to the next in response to a shift signal. As will be presently apparent, each storage unit includes three of the semiconductor devices. Two units are shown: The first unit comprises the semiconductor devices 1, 2, 3 and the second unit, the devices 4, 5, 6. The semiconductor switching device 1 has its end junction resistively connected to the line *a* through a current limiting resistor $R_a$. The outer n-type region of the device is connected to the outer p-type region of the device 2. The common junction of the devices is connected to line *b* through a current limiting resistor $R_b$. The outer n-type region and the outer p-type region of the devices 2 and 3 are interconnected and are connected to line *c* to the current limiting resistor $R_c$. Similarly, the outer n-type and p-type regions of the remaining devices are interconnected and connected to the respective lines through current limiting resistors. Thus, the common junction of the devices 3 and 4 is connected to line *a* through the resistor $R_a'$. The common junction of devices 4 and 5 is connected by the limiting resistor $R_b'$ to line *b*. The common junction of the devices 5 and 6 is connected by the current limiting resistor $R_c'$ to line *c*. The resistor $R_a''$ connects the common junction of the devices 6 and 7 (not shown) to line *a*. As will be apparent upon inspection of the diagram, subsequent storage units will comprise three semiconducting switching devices with their common junctions connected to the respective lines *a, b, c* in the sequence illustrated.

The resistors in Figure 1 are all assumed to have substantially equal values except for $R_1$. The value should be chosen in conformity with the characteristics of the semiconducting devices. In particular, the resistance should be low compared to the high resistance (non-conducting) condition for the device, and high compared to the low resistance (conducting) condition of the device. Referring to Figure 4, we see that in the non-conducting condition the maximum voltage across the device will be of the order of $V_B$, and the current will be small. A rough measure of the resistance of the device in the non-conducting condition is given by dividing the voltage $V_B$ by the current. On the other hand, in the conducting condition the current may be relatively high and the voltage $V_s$ small. The resistance of the device in the conducting state is given by the ratio of these values. In order that the device functions stably, the power input corresponding to voltage and current in the conducting direction must be well within the dissipation range of the device. Resistors in Figure 1 should be larger by a factor of 10 or 100 fold than the resistance given by $V_s/I_s$.

If suitable driving voltages are applied to the lines *a*, *b*, *c* the digital information stored in each of the storage units will be shifted from one unit to the next in a manner to be presently described.

If voltages $V_a$, $V_b$, and $V_c$ are applied to the corresponding lines *a*, *b*, *c*, then the voltage which appears between the driving lines will be given by the following relationships:

$$V_1=V_a-V_b$$
$$V_2=V_b-V_c$$
$$V_3=V_c-V_a$$

Figure 2:
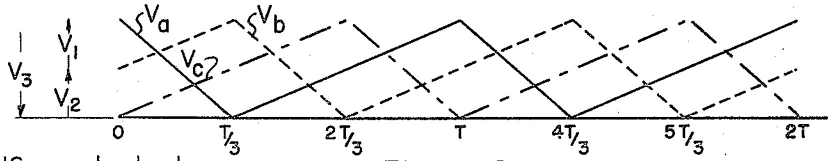
Figure 2 shows a suitable advancing voltage wave applied to the driving lines of the register of Figure 1.

The transfer of information from one unit of the device to the next may be understood by reference to Figures 1 and 2. First, consider the situation at time *t* equals 0, at which instant the voltage wave on *a* is at its maximum, *b* is halfway between the maximum and minimum, and $c$ is at its minimum. Under these conditions, if neither device 1 nor 2 is broken down, the currents are small. The voltage drops across the resistors $R_a$, $R_b$, $R_c$ are also very small since these resistors have values which are low compared to the non-conducting resistance of the associated devices. It should be noted that the voltage across 3 will be in the direction in which the device always has a high resistance.

Accordingly, the voltage across device 1 is substantially equal to the voltage between lines $a$ and $b$, i.e., as is illustrated in Figure 2, is represented by the voltage $V_1$. Similarly, the voltage across device 2 is $V_2$. If $V_1$ is less than the breakdown voltage of 1, and $V_2$ less than the breakdown voltage of 2, then the device will remain in the non-conducting condition.

However, if a separate input signal is applied through resistor $R_1$ so that the voltage at point $P_a$ rises and becomes sufficiently more positive than $P_b$ to exceed the breakdown voltage of device 1, it will break down and go into a high current condition. If device 2 does not break down (we shall show below that it does), then the voltage across device 1 will be approximately the value $V_s$ (sustaining voltage). The drops across resistors $R_a$ and $R_b$ are much larger than that across device 1. This holds true since it was assumed that the resistors are large compared to the conducting resistance of device 1. Under these conditions the potential $V_1$ between lines $a$ and $b$, will be divided across $R_a$, $R_b$ and the device 1. The fraction appearing across $R_b$ is given by $$(\tfrac{1}{2})(V_1-V_s)$$

provided that $R \gg V_s/I_s$. The voltage across device 2, if it is in the non-conducting condition, will be equal to $V_2$ plus the voltage drop across $R_b$, or $$V_2+(\tfrac{1}{2})(V_1-V_s)$$

If this voltage is greater than or equal to $V_B$ (the breakdown voltage) then device 2 will break down. Thus, by pulsing device 1, both devices 1 and 2 will break down. On the other hand, device 3 will simply acquire a smaller bias in the reverse direction as a result of devices 1 and 2 breaking down. The necessity of having a device which can stand a reverse voltage more than two times the maximum voltage applied to a device in the forward direction is apparent.

Consider next how the conditions corresponding to storage of intelligence corresponding to "0" or "1" is transmitted through the device in response to suitable driving voltages, for example, of the type shown in Figure 2. By a "1" condition at time $t=0$, we shall mean that both devices 1 and 2 are broken down, and by a "0" condition that neither device 1 nor 2 is broken down. If we consider what happens between time 0 and time T, we shall see, as will be presently described, that the breakdown condition will advance so that the situation prevailing in the first storage unit, devices 1, 2, 3 is transmitted to the second storage unit devices 4, 5, 6. It will suffice to consider what hapens in a time T, since this translates the storage of information by one storage unit and the behavior in all subsequent periods T is precisely the same.

The voltage $V_1$ rapidly decreases and is negative at T/3. On the other hand, the voltage $V_2$ remains constant. Thus, device 1 becomes non-conducting and device 2 remains conducting. At instant T/3 the voltage wave has advanced by one device. Device 2 is broken down and, therefore, if device 3 has not already broken down, it will break down at this instant for the same reason that device 2 broke down before when device 1 was turned on. That is, the voltage across device 3 is $$V_3+(\tfrac{1}{2})(V_2-V_s)$$

which is greater than the breakdown voltage.

At time $2T/3$, the voltage wave has again advanced by one device. Reasoning as before, it is apparent that device 4 will become conducting and device 2 will become non-conducting. At the time T the voltage wave has again advanced and the information originally in devices 1, 2, 3 will be stored in devices 4, 5, 6.

It is evident that if the devices 1 and 2 are not broken down, the voltage will not at any time between 0 and T exceed the breakdown value for any of the devices. Thus, it follows that "0" or "1" in the first three devices will shift over by one device in the time from 0 to $T/3$. Similarly, between $T/3$ and $2T/3$ it will shift one more device, etc., so that a complete cycle will be achieved in a time T.

Figure 5:
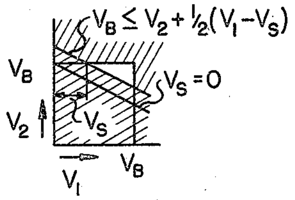
Figure 5 illustrates the operating region of the switching semiconductor device employed in the shifting register.

Figure 5 shows the critical coinditions which determine the tolerances for the voltages and the characteristics of the device. The voltages $V_1$ and $V_2$ must both be less than $V_B$ or else it will be impossible to store or transmit a "0." This means that the shaded area outside of the square is excluded. Also, the condition that device 2 breaks down after device 1 has broken down is given by the condition that the voltage across device 2 exceeds $V_B$. This condition leads to the equation $$V_B \leqq V_{2max}+(\tfrac{1}{2})(V_1-V_s)$$

Values less than those given by the equal sign are thus excluded. This area is also shown shaded on the diagram. Therefore, the operating condition lies in the clear triangle. It is evident that if $V_s$ is equal to $V_B$ then there will be no operating range. On the other hand, if $V_s$ is equal to 0, then a relatively large operating range is found.

Suitable means may be employed to stop the advances of the voltage wave and to lock the digital information at a particular position in the register. Preferably, the information is locked when the information is in the devices 3, 6, 9, etc. The information may then be obtained in parallel by pulsing the respective semiconducting device. If the device is conducting, the pulses will pass therethrough with ease and a suitable indication for use in associated apparatus may be derived. If the device is non-conducting, no current will flow and again a suitable indication for associated apparatus may be obtained.

On the other hand, it may be desirable to obtain the information serially. Thus, the information may be obtained at the end of each cycle from the last semiconducting switching device of the last storage unit. This may be accomplished either by pulsing or by measuring the voltage across the device.

Figure 6:
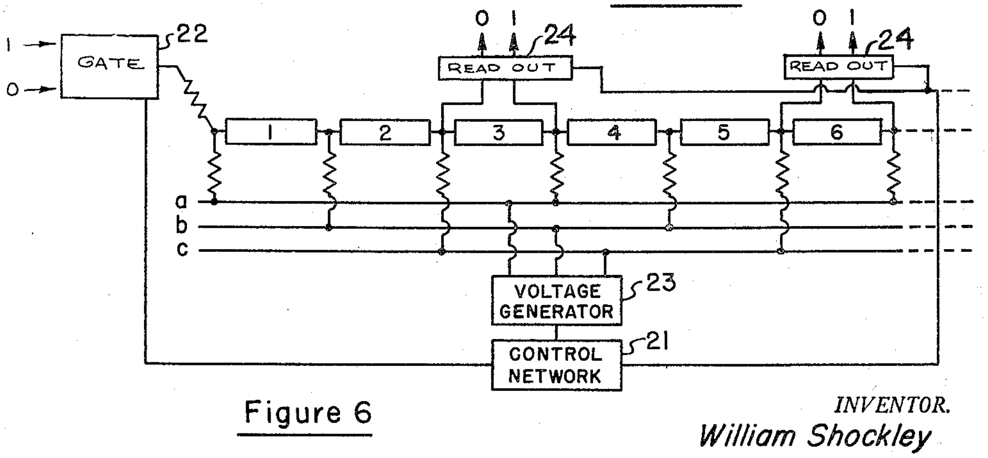
Figure 6 shows a shifting register system.

Referring particularly to Figure 6, a representative system is shown. The control network 21 serves to control a gate 22. The gate controls the application of pulses to the first semiconducting switching device so that the pulse is applied at the correct time. Thus, if the gate is open, the device will receive or not receive a pulse, depending upon whether the information is "0" or "1." Pulses cannot be applied thereafter to cause this unit to conduct until the information has been transferred from the first storage unit to the next.

The control network also serves to control the voltage generator 23. The control network will operate the voltage generator 23 to advance the wave periodically in such a manner as to transfer the information to the read-out positions of the various storage units. If the voltage generator continuously operates, then the information is continuously shifted. Upon application of a control signal the voltage generator will complete a cycle and hold the information in the read-out positions. In parallel operation the control network will also serve to control the read-outs 24 whereby the information contained in the associated switching device may be applied to associated circuits. If the information is read out serially, the control circuit serves to control the read-out from the appropriate switching device.

It is apparent that the switching devices may be reversed and controlled by application of voltage waves having suitable polarities. It is also apparent that voltages may be generated which cause a shift of information in the opposite direction.

This invention is not to be limited to the specific embodiments shown. These are merely illustrative and various modifications may be made therein without departing from the spirit and scope of this invention.

I claim:

1. A shift register comprising a plurality of serially connected storage units each serving to store one digit of information, each of said storage units including three semiconductor switching devices serially connected, means for applying input information to the first storage unit, driving lines coupled to the switching devices and serving to receive a shift signal and apply the same to the switching devices, and means for reading out the information stored in the storage units.

2. A shift register comprising a plurality of serially connected storage units each serving to store one digit of information, each of said storage units comprising three semiconductor switching devices serially connected, said switching devices having a reverse breakdown voltage greater than two times the forward breakdown voltage, three driving lines, and resistors serving to connect alternate lines to successive ones of said devices, said resistors having a resistance high in comparison to the resistance of the devices in the conducting state and low in comparison to that of the devices in the non-conducting state, and means for reading out the information stored in the storage units.

3. A shift register as in claim 2 in which each of said semiconductor switching devices comprises a semiconductor device having n-p-n-p regions with the outer n-type region electrically connected to the outer p-type region of adjacent devices.

4. A shift register comprising a plurality of serially connected storage units each serving to store one digit of information, each of said storage units comprising three semiconductor switching devices serially connected, means for applying input information to the first storage unit, means for applying a shift signal to each of said devices, and means for reading out the information stored in the storage units.

5. A shift register comprising a plurality of serially connected storage units each serving to store one digit of information, each of said storage units comprising three semiconductor switching devices having n-p-n-p type regions serially connected with the outer n-type region of one device being electrically connected to the outer p-type region of the adjacent device, means for applying input information to the first storage unit, means for applying a shift signal to each of said devices, and means for reading out the information stored in the storage units.

6. A shift register comprising a plurality of serially connected storage units each serving to store one digit of information, each of said storage units including three semiconductor switching devices having n-p-n-p type regions serially connected, the outer n-type region of each of the devices being connected to the outer p-type region of adjacent devices, means for applying input information to the first storage unit, driving lines, means for connecting alternate lines to one terminal of successive ones of the devices with the same device of each storage unit connected to the same line, and means for reading out the information stored in the storage units.

7. A shift register comprising a plurality of serially connected storage units each serving to store one digit of information, each of said storage units comprising three semiconductor switching devices having first and second terminals, three driving lines, means for applying input information to the first storage unit, current limiting resistor serving to connect the first terminal of successive devices to alternate ones of said lines, and means for reading out the information stored in the storage units.

8. A shift register as in claim 7 in which each of said semiconductor switching devices comprises a semiconductor device having n-p-n-p conductivity type regions with the terminal leads connected to the outer n and p regions.

9. A shift register comprising a plurality of serially connected storage units each serving to store one digit of information, each of said units comprising three semiconductor switching devices serially connected, each of said devices having a reverse breakdown voltage greater than two times the forward breakdown voltage, means for applying input information to the first storage unit, means for applying a shift signal to each of said devices, and means for reading out the information stored in the storage units.

10. A shift register comprising a plurality of serially connected storage units each serving to store one digit of information, each of said units comprising three semiconductor switching devices serially connected, each of said devices having a reverse breakdown voltage greater than two times the forward breakdown voltage, and each of said devices having a forward breakdown sustaining voltage which is less than the forward breakdown voltage, means for applying input information to the first storage unit, means for applying a shift signal to said devices, and means for reading out the information stored in the storage units.

11. A shift register comprising a plurality of serially connected storage units each serving to store one digit of information, each of said storage units comprising three semiconductor switching devices having first and second terminals, each of said devices having a reverse breakdown voltage greater than two times the forward breakdown voltage, and a forward breakdown sustaining voltage which is less than the forward breakdown voltage, means for applying input information to the first storage unit, three driving lines, current limiting resistors serving to connect the first terminal of successive ones of said devices to alternate ones of said lines, and means for reading out the information stored in the storage units.

12. A shift register as in claim 11 wherein said resistors are so selected that they have a high resistance in comparison to the resistance of the devices in the forward breakdown state and a low resistance in comparison to that of the reverse resistance of the devices.

13. A shift register as in claim 12 wherein said devices comprise a semiconductor device having n-p-n-p conductivity type regions with the outer n-type region electrically connected to the outer p-type region of adjacent devices.

References Cited in the file of this patent

UNITED STATES PATENTS

| | | |
|---|---|---|
| 2,513,109 | Roth | June 27, 1950 |
| 2,655,610 | Ebers | July 22, 1952 |
| 2,717,372 | Anderson | Sept. 6, 1955 |

FOREIGN PATENTS

| | | |
|---|---|---|
| 166,800 | Australia | Apr. 8, 1954 |
| 1,096,793 | France | Feb. 2, 1955 |